(12) United States Patent
Spagna et al.

(10) Patent No.: US 12,441,551 B2
(45) Date of Patent: Oct. 14, 2025

(54) CONVEYING DEVICE OF PRODUCTS FOR AUTOMATIC DISPENSERS

(71) Applicant: SANDENVENDO EUROPE S.P.A, Coniolo (IT)

(72) Inventors: Danilo Spagna, Coniolo (IT); Daniele Ziliotto, Coniolo (IT)

(73) Assignee: SANDENVENDO EUROPE S.P.A, Coniolo (IT)

( * ) Notice: Subject to any disclaimer, the term of this patent is extended or adjusted under 35 U.S.C. 154(b) by 616 days.

(21) Appl. No.: 17/434,770

(22) PCT Filed: Feb. 25, 2020

(86) PCT No.: PCT/IT2020/000023
§ 371 (c)(1),
(2) Date: Aug. 30, 2021

(87) PCT Pub. No.: WO2020/178867
PCT Pub. Date: Sep. 10, 2020

(65) Prior Publication Data
US 2022/0135337 A1    May 5, 2022

(30) Foreign Application Priority Data
Mar. 7, 2019   (IT) .................. 102019000003287

(51) Int. Cl.
*B65G 19/02*      (2006.01)
*B65G 19/24*      (2006.01)
(Continued)

(52) U.S. Cl.
CPC .......... *B65G 19/02* (2013.01); *B65G 19/245* (2013.01); *B65G 33/06* (2013.01); *G07F 11/58* (2013.01); *B65G 2203/0283* (2013.01)

(58) Field of Classification Search
CPC ...... B65G 19/02; B65G 19/245; B65G 33/06; B65G 2203/0283; G07F 11/24; G07F 11/42; G07F 11/58
See application file for complete search history.

(56) References Cited

U.S. PATENT DOCUMENTS 472,507 A * 4/1892 Moran .................... G07F 11/04
221/75
487,409 A * 12/1892 Moran .................... G07F 17/24
221/75
(Continued)

FOREIGN PATENT DOCUMENTS

| EP | 0685827 A1 | 12/1995 |
| EP | 1994509 B1 | 7/2009 |
| WO | 2005109355 A2 | 11/2005 |

*Primary Examiner* — Gene O Crawford
*Assistant Examiner* — Kelvin L Randall, Jr.
(74) *Attorney, Agent, or Firm* — S.J. Intellectual Property LTD.

(57) ABSTRACT

A product conveying device (10) for automatic dispensers is described, comprising a supporting element (1), configured to support the product being delivered, a thrusting element (3) sliding connected on guiding means (5) to the supporting element (1), at least one pair of worm screws (2), counter-rotating with synchronous movement, rotating connected to the supporting element (1) and to the thrusting element (3), to advance the thrusting element (3) along the guiding means (5) in order to thrust the product towards a terminal end (A) of the supporting element (1), to make it fall towards an outlet mouth from the automatic dispenser.

3 Claims, 4 Drawing Sheets

(51) Int. Cl.
*B65G 33/06* (2006.01)
*G07F 11/58* (2006.01)

(56) References Cited

U.S. PATENT DOCUMENTS

| | | | | |
|---|---|---|---|---|
| 3,313,398 | A * | 4/1967 | Andrews | B21B 43/04 |
| | | | | 198/663 |
| 4,840,290 | A * | 6/1989 | Nakamura | G07D 1/04 |
| | | | | 221/196 |
| 6,082,580 | A * | 7/2000 | Mueller | G07F 11/42 |
| | | | | 414/749.5 |
| 6,230,932 | B1 * | 5/2001 | Lowing | G07F 11/045 |
| | | | | 221/280 |
| 6,318,591 | B1 * | 11/2001 | Martin | G07F 11/045 |
| | | | | 221/280 |
| 6,425,579 | B1 * | 7/2002 | Andreyka | B65H 1/025 |
| | | | | 104/166 |
| 6,604,652 | B1 | 8/2003 | Trautwein | |
| 2005/0000977 | A1 * | 1/2005 | Mazlout | G07F 11/42 |
| | | | | 221/231 |
| 2006/0273104 | A1 * | 12/2006 | Zychinski | G07F 11/38 |
| | | | | 221/123 |
| 2007/0017928 | A1 * | 1/2007 | Coppola | G07F 11/42 |
| | | | | 221/75 |
| 2007/0199951 | A1 * | 8/2007 | Levasseur | G07F 11/24 |
| | | | | 221/124 |
| 2010/0237091 | A1 * | 9/2010 | Garson | G07F 11/16 |
| | | | | 221/226 |
| 2011/0015781 | A1 * | 1/2011 | Vardaro | B65D 83/0418 |
| | | | | 700/231 |
| 2011/0284571 | A1 * | 11/2011 | Lockwood | G07F 9/002 |
| | | | | 221/151 |

* cited by examiner

CONVEYING DEVICE OF PRODUCTS FOR AUTOMATIC DISPENSERS

The present invention refers to a conveying device of products for automatic dispensers, in particular for automatic dispensers of packaged edible goods or durable goos, which is compatible with currently used automatic dispensers.

Automatic dispensers are known, for products stored on many rows arranged at different heights, in which the products to be delivered are placed inside a plurality of compartments, defined in each housing row. In particular, different type of product conveying devices are known used in the automatic dispensers for delivering selected products: with plates or disks, of the fall or the thrust type; the most widesprear one is the spiral-type conveying and/or delivering device, which comprises a spiral element arranged on each housing row and composed of a spring with constant pitch, in whose coils the products to be conveyed are inserted for their delivery.

The spiral element is driven in rotation around its own axis by a motor-reducer which rotates the spiral corresponding to the selected product, to convey the purchased product towards the outlet mouth of the automatic dispenser.

Depending on sizes and type of products to be dispensed, the spiral elements have different sizes and pitches, and can have variable distances between the axes and between the axes of the motor-reducers which drive them.

Such spiral conveying devices, through being cheap and simple to be made, have some problems: they cause a loss of loading space of the products and their inclined positioning, due to the spiral shape, require the replacement of the spiral to adapt it to different types of products, and impose dimensional limits to the products which can be dispensed.

Other types of product conveying devices for automatic dispensers of a known type provide for the use of motored conveyor belts, configured for transporting the products towards the outlet mouth of the dispenser.

However, donveyor devices with conveyor belts have the problem that, due to the effect of the shape of packages of products and/or of the housing seats obtained on the conveyor belt, the thrust exerted by the belt can be not enough to convey the purchased product towards the outlet mouth of the automatic dispenser, and generate its fall.

Moreover, the housing seats are not shaped to contain any type of product, and therefore do not allow their use for delivering a wide range of products.

Object of the present invention is solving the above prior art problems, by providing a conveying device of products for automatic dispensers, which allows dispensing products with different shapes and sizes, in an efficient and reliable way.

Another object of the present invention is making a conveying device of products for automatic dispensers, which allows using it with known automatic dispensers.

A further object of the invention is making a conveying device of products for automatic dispensers which can be easily made, is reliable and built with small costs, with respect to known delivering mechanisms.

The above and other objects and advantages of the invention, as will appear from the following description, are obtained with a conveying device of products for automatic dispensers as claimed in claim 1. Preferred embodiments and non-trivial variations of the present invention are the subject matter of the dependent claims.

It is intended that all enclosed claims are an integral part of the present description.

It will be immediately obvious that numerous variations and modifications (for example related to shape, sizes, arrangements and parts with equivalent functionality) can be made to what is described, without departing from the scope of the invention as detailed in the enclosed claims.

The present invention will be better described by some preferred embodiments thereof, provided as a non-limiting example, with reference to the enclosed drawings, in which.

Figure 1:
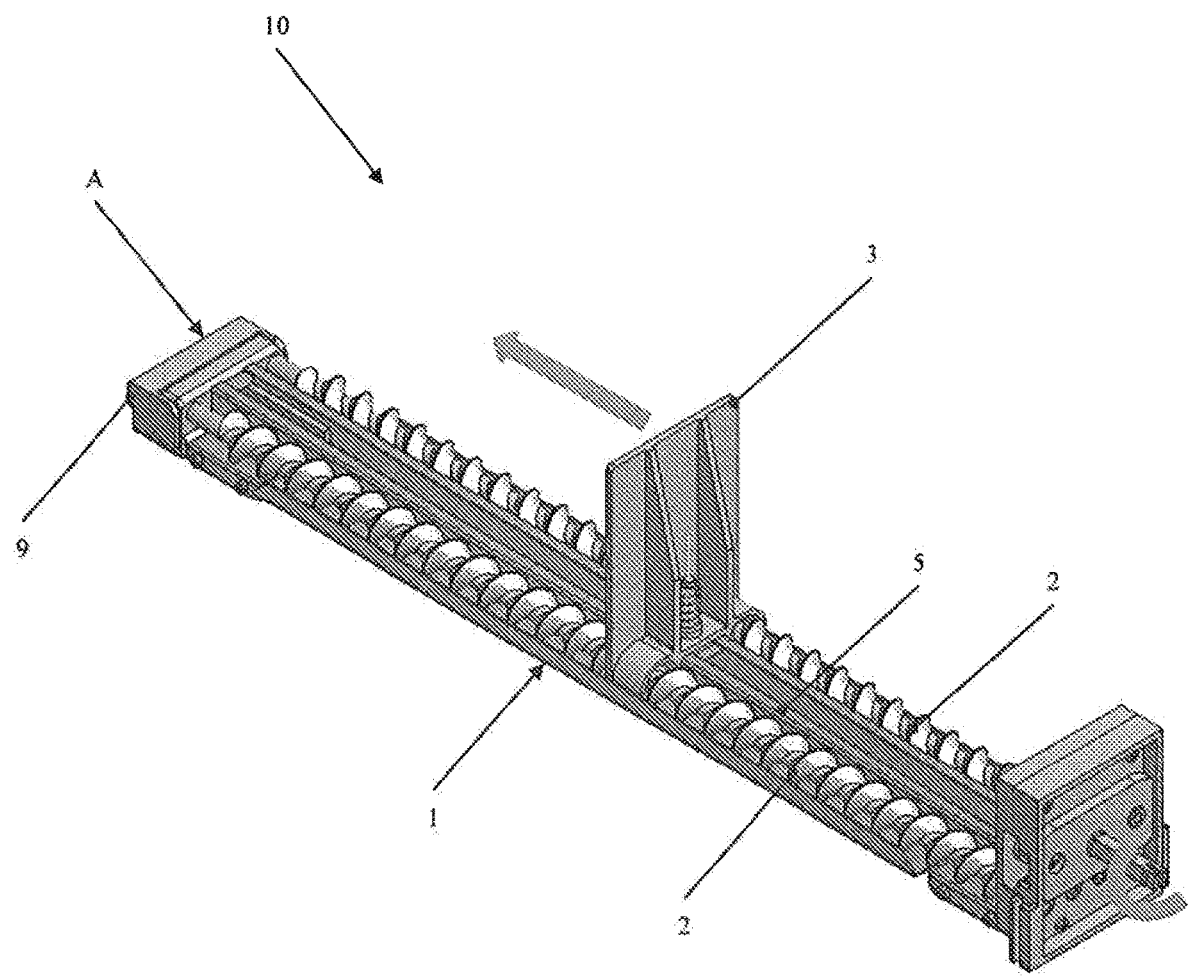
FIG. 1 is a perspective view of the conveying device of products for automatic dispensers according to the present invention.
Figure 2:
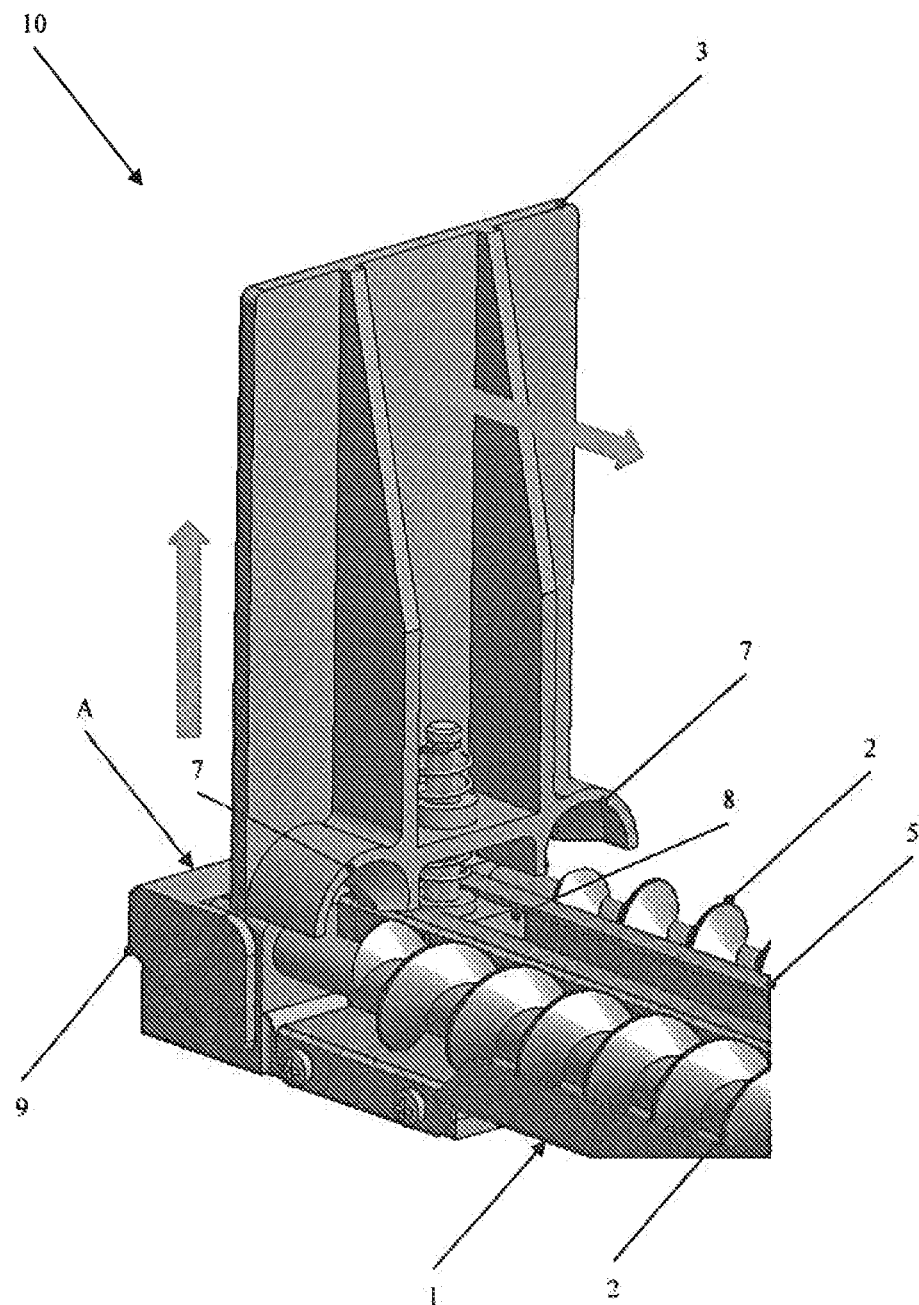
FIG. 2 is a perspective view of a part of the conveying device of products for automatic dispensers according to the present invention.
Figure 3:
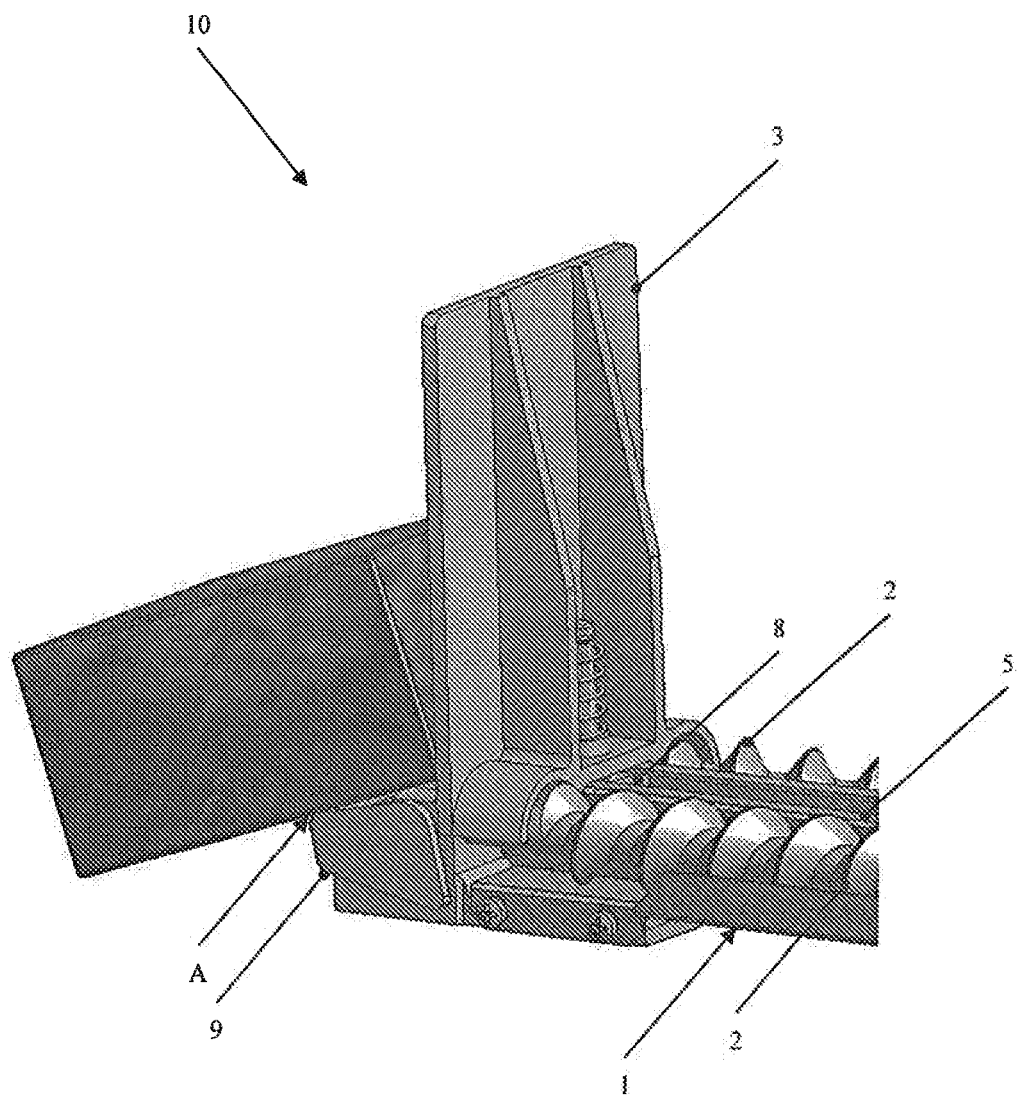
FIG. 3 is a perspective view of a part of the conveying device of products for automatic dispensers according to the present invention in a configuration thereof.
Figure 4:
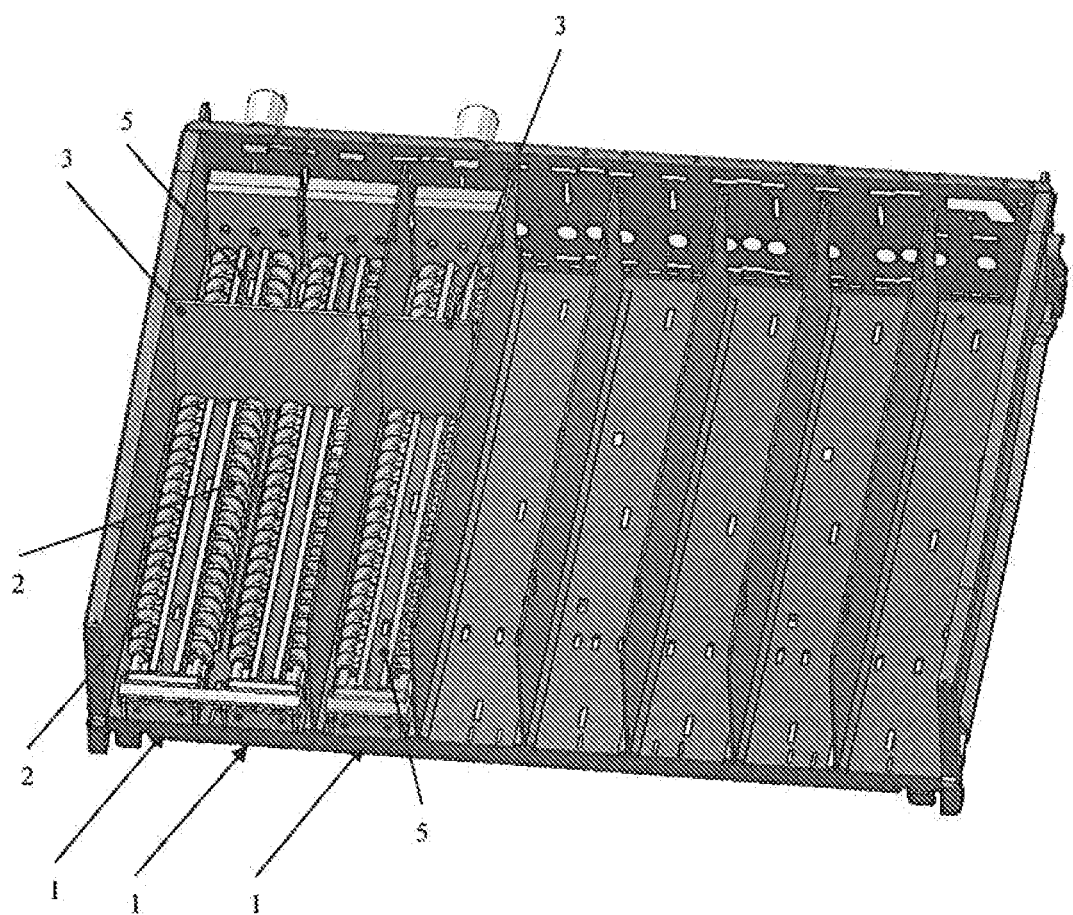
FIG. 4 is a perspective view of conveying devices of products for automatic dispensers according to the present invention in their operating position.

With reference to the Figures, the product conveying device 10 for automatic dispensers according to the present invention comprises: a supporting element 1, configured to support the product being delivered; a thrusting element 3 sliding connected on guiding means 5 to the supporting element 1, at least one pair of worm screws 2, counter-rotating with synchronous movement, rotating connected to the supporting element 1 and to the thrusting element 3, to advance said thrusting element 3 along the guiding means 5 in order to thrust the product towards a terminal end A of the supporting element 1, to make it fall towards the outlet mouth from the automatic dispenser.

Preferably, the product conveying device 10 for automatic dispensers according to the present invention further comprises motor means, for example an electric motor, for actuating the worm screws 2, preferably connected thereto through a cascade of gear, and controlled in a known way by a control unit connected to sensors, for example comprising position sensors of the thrusting element 3, of the worm screws 2 and of the motor; in a preferred way, it comprises a limit sensor placed next to the terminal end A of the supporting element 1, next to the fall point of the product towards the outlet mouth from the automatic dispenser, to stop the advancement of the thrusting element 3 when it arrives at the terminal end A of the supporting element 1, and to select a product when the conveying device 10 is empty; preferably, the product conveying device 10 for automatic dispensers of the invention comprises a slide element 9, connected to the terminal end A of the supporting element 1, rotatable around a transverse axis to the longitudinal axis of the worm screws 2, in order to rotate by being inclined under the action of the weight of the product, when this latter one is moved by the thrusting element 3 outside the supporting element 1 and starts its fall towards the outlet mouth from the automatic dispenser.

Preferably, the thrusting element 3 is engaged in the worm screws 2, for example comprises a seat configured to be coupled with the screw 2, engaging the threads of the worm screws 2, in order to be advanced along the guiding means 5 by the rotation of the screws; for example, a thrusting element 3 can be coupled with a supporting element 1 comprising a pair of counter-rotating worm screws 2, or two side-by-side supporting elements 1, and be thereby coupled with two pairs of counter-rotating worm screws 2, and so on, to increase the sizes of the products which can be stored in the automatic dispenser.

In a preferred way, the guiding means comprise a rectilinear guide 5, parallel to the longitudinal axis of the worm screws 2; preferably, the guide 5 is obtained in the supporting element 1.

The thrusting element 3 is removable or liftable, to move it away from the screws 2 and bring it back to the starting position, to load again the products in the dispenser; for example, the guiding means comprise a slider 8 sliding on the guide 5, connected to the thrusting element 3 with a locking screw which can be slackened to allow moving away the thrusting element 3 from the guide 5; in a preferred way, the slider 8 is connected to the thrusting element 3 so that the guide 5 is interposed between the thrusting element 3 and the slider 8.

In a preferred way, the worm screws 2 and/or the guide 5 are configured to support the product in the product conveying device 10, so that it is abutted on their thread and/or on the upper part of the guide 5; consequently, the ridge of the threading of the screws 2 can be at the same height as of the upper part of the guide 5, or at different heights.

Advantageously, the conveying device of products for automatic dispensers of the invention allows efficiently and reliably dispensing products having different shapes and sizes, is usable with automatic dispensers present on the market, is simple to make, reliable and can be built with small costs.

The invention claimed is:

1. A product conveying device for automatic dispensers comprising:
   a supporting element, configured to support the product being delivered;
   a thrusting element sliding connected on guiding means to the supporting element;
   said thrusting element being located on top of at least one pair comprising two worm screws, said two worm screws counter-rotating with synchronous movement, rotating connected to the supporting element and to the thrusting element, to advance said thrusting element along the guiding means in order to thrust the product towards a terminal end of the supporting element, to make the product fall towards an outlet mouth from the automatic dispenser, wherein the guiding means is located between the two worm screws;
   wherein the thrusting element is engaged with both worm screws in order to be advanced along the guiding means by a rotation of the screws, the thrusting element comprising a seat being formed with a mount for each of the worm screws and configured to be coupled with the worm screws, engaging threads of both worm screws in order to advance the thrusting element along the guiding means,
   characterized in that the guiding means comprise a slider interposed between the worm screws and configured for sliding on a guide obtained in the supporting element, the slider being connected to the thrusting element with a locking screw which can be slackened to allow the thrusting element to be lifted away from the screws while still engaged with the slider in order to bring it back to a starting position, to load again the products in the dispenser.

2. A product conveying device for automatic dispensers according to claim 1, characterized in that the guide is a rectilinear guide, parallel to the longitudinal axis of the worm screws.

3. A product conveying device for automatic dispensers according to claim 1, characterized in that the worm screws and/or the guide are configured to support the product in the product conveying device, so that it is abutted on the threads of the worm screws and/or on the upper part of the guide.

* * * * *